(12) United States Patent
Watanabe et al.

(10) Patent No.: US 9,527,161 B2
(45) Date of Patent: Dec. 27, 2016

(54) WELDED STRUCTURE AND MANUFACTURING METHOD THEREOF

(71) Applicant: NIDEC SANKYO CORPORATION, Suwa-gun, Nagano (JP)

(72) Inventors: Toshiyuki Watanabe, Nagano (JP); Kazuhiko Yanagisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 37 days.

(21) Appl. No.: 14/717,362

(22) Filed: May 20, 2015

(65) Prior Publication Data
US 2015/0336211 A1 Nov. 26, 2015

(30) Foreign Application Priority Data
May 21, 2014 (JP) .................................. 2014-105448

(51) Int. Cl.
G02B 7/02 (2006.01)
B23K 26/20 (2014.01)
G02B 27/64 (2006.01)
B23K 26/24 (2014.01)

(52) U.S. Cl.
CPC .............. *B23K 26/20* (2013.01); *B23K 26/24* (2013.01); *G02B 7/02* (2013.01); *G02B 27/646* (2013.01); *B23K 2203/05* (2015.10); *Y10T 403/478* (2015.01)

(58) Field of Classification Search
USPC .................................. 359/811, 813, 819, 900
See application file for complete search history.

(56) References Cited

FOREIGN PATENT DOCUMENTS

JP 61115691 A 6/1986

*Primary Examiner* — Jack Dinh
(74) *Attorney, Agent, or Firm* — Cantor Colburn LLP (57) ABSTRACT

A welded structure may include a first member having a spherical surface part, and a second member which is formed in a plate shape. A part of an end face of the second member before laser welding is performed is formed to be a contact end face having a contact part with which a part of the spherical surface part is contacted. The second member is formed with a joining part including the contact end face and the joining part is joined to the spherical surface part by laser welding. At least before laser welding is performed, a plate thickness of the joining part is thinner than a plate thickness of a portion of the second member except the joining part and the spherical surface part of the first member and the end part of the second member are joined to each other by laser welding.

16 Claims, 5 Drawing Sheets

WELDED STRUCTURE AND MANUFACTURING METHOD THEREOF

CROSS REFERENCE TO RELATED APPLICATION

The present invention claims priority under 35 U.S.C. §119 to Japanese Application No. 2014-105448 filed May 21, 2014, the entire content of which is incorporated herein by reference.

FIELD OF THE INVENTION

At least an embodiment of the present invention may relate to a welded structure formed so that a spherical surface part formed in a spherical surface shape is joined to an end face of a plate-shaped member by laser welding and relate to a manufacturing method of the welded structure.

BACKGROUND

Conventionally, a joining method of a metal ball has been known in which a metal ball is joined to a joined body formed in a flat plate shape by laser welding (for example, see Japanese Patent Laid-Open No. Sho 61-115691). In the joining method of a metal ball described in the Patent Literature, a circular through-hole having a diameter smaller than that of the metal ball is formed in a joined body and an edge of the through-hole and the metal ball are welded and joined to each other.

In the Patent Literature described above, a method is disclosed in which a metal ball is welded to a surface of a joined body formed in a plate shape. However, in this Patent Literature, a method is not disclosed in which a spherical surface part formed in a spherical surface shape is welded to an end face of a member formed in a plate shape from a side, for example, welded to a side face of a plate spring having a predetermined thickness,.

SUMMARY

In view of the problem described above, at least an embodiment of the present invention may advantageously provide a welded structure which is formed such that a spherical surface part formed in a spherical surface shape and an end face of a plate-shaped member are joined to each other by laser welding, the welded structure being capable of reducing output of a laser when the spherical surface part is welded and capable of suppressing generation of a spatter when the spherical surface part is welded, and provide a manufacturing method of the welded structure.

According to at least an embodiment of the present invention, there may be provided a welded structure including a first member having a spherical surface part which is formed in a spherical surface shape and a second member which is formed in a plate shape. A part of an end face of the second member before laser welding is performed is a contact end face having a contact part with which a part of the spherical surface part is contacted, and the second member is formed with a joining part including the contact end face and the joining part is joined to the spherical surface part by laser welding. At least before laser welding is performed, a plate thickness of the joining part is thinner than a plate thickness of a portion of the second member except the joining part, and the spherical surface part of the first member and the end part of the second member are joined to each other by laser welding.

In the welded structure in at least an embodiment of the present invention, a part of an end face of the second member before laser welding is performed is a contact end face having a contact part with which a part of the spherical surface part is contacted. Further, in at least an embodiment of the present invention, a plate thickness of the joining part of the second member, which includes the contact end face and is joined to the spherical surface part by welding, is thinner than a plate thickness of a portion of the second member except the joining part at least before laser welding is performed. Therefore, according to at least an embodiment of the present invention, the maximum gap space in a direction perpendicular to the thickness direction of the second member between the spherical surface part and the contact end face can be reduced before laser welding is performed. Accordingly, in at least an embodiment of the present invention, output of a laser when the spherical surface part is welded to the joining part can be reduced. Further, according to at least an embodiment of the present invention, output of a laser when the spherical surface part is welded to the joining part can be reduced and, in addition, the maximum gap space in a direction perpendicular to the thickness direction of the second member between the spherical surface part and the contact end face can be reduced and thus generation of a spatter when the spherical surface part is welded to the joining part can be suppressed.

In at least an embodiment of the present invention, the second member is structured of two third members which are formed in a plate shape and are laminated so as to abut with each other. In a case that a plate-shaped member formed in a plate shape is produced by etching or press working, a certain limitation is found in an aspect ratio which is a ratio between a width and a thickness of the plate-shaped member and, when the width of the plate-shaped member is narrowed, the plate-shaped member is unable to be made thick. However, according to the embodiment of the present invention, the third member whose width is narrow is produced by etching or press working and thus, even when the thickness of the third member is thin, the thickness of the second member can be made thick.

In at least an embodiment of the present invention, the first member is a spherical body an entire of which is the spherical surface part, and the second member is a gimbal spring. In this case, even when the third member whose width is narrow is produced by etching or press working and the thickness of the third member is reduced, the thickness of the second member can be made thick. In other words, the thickness of the gimbal spring can be made thick. Therefore, the thickness of the gimbal spring can be set in a desired thickness and, as a result, the gimbal spring can be obtained which is provided with desired spring characteristics. Specifically, it may be structured that the second member is a gimbal spring which is structured of two plate springs laminated on each other, the gimbal spring is formed in a substantially square frame shape having four sides each of which is provided with a spring part, the joining part is formed at a corner part of each of four corners of the gimbal spring, the first member is made of a spherical body, a plate thickness of the joining part is thinner than a plate thickness of the spring part of the gimbal spring and is smaller than a diameter of the spherical body, and four spherical bodies are respectively joined to the contact end faces which are provided on inner sides of the corner parts of the four corners of the gimbal spring by laser welding.

In at least an embodiment of the present invention, the spherical surface part is joined to the joining part by laser welding and thereby the two third members and the spherical surface part are joined to each other and the two third members are joined to each other. According to this structure, another process is not required to provide separately for joining the two third members to each other. Therefore, a manufacturing process of the welded structure can be simplified.

In at least an embodiment of the present invention, thicknesses of the two third members in the joining part are equal to each other, abutting faces of the two third members and a center of curvature of the spherical surface part are substantially coincided with each other in a thickness direction of the second member, and a laser is irradiated from both sides in the thickness direction of the second member and thereby the spherical surface part is joined to the joining part. According to this structure, the spherical surface part can be fixed to the joining part in the thickness direction of the second member in a well-balanced manner.

In at least an embodiment of the present invention, a cut-out part is formed in the joining part of one of the two third members before laser welding is performed, the cut-out part being penetrated in a thickness direction of the third member and being opened on a side of the contact end face, and a laser is irradiated to the cut-out part from a side of the one of the two third members formed with the cut-out part in the thickness direction of the second member and thereby the two third members and the spherical surface part are joined to each other and the two third members are joined to each other. According to this structure, when the spherical surface part is to be welded to the joining part, a laser is not required to irradiate from the other third member side and, as a result, when the spherical surface part is to be welded to the joining part, the number of irradiation times of the laser can be reduced. Therefore, a manufacturing process of the welded structure can be simplified. Specifically, the gimbal spring is structured of two plate springs having the same width and the same thickness which are laminated so as to abut with each other, the joining part of one of the two plate springs is formed with a cut-out part for exposing the joining part of the other plate spring which is abutted with the spherical body, and a laser is irradiated to the cut-out part from a side of the one of the two plate springs formed with the cut-out part and thereby the spherical body and the joining part of the other plate spring are welded to each other. In this case, for example, the gimbal spring can be used as a gimbal spring for swingably holding a movable module on which a lens for photographing and an imaging element are mounted through the four spherical bodies.

In at least an embodiment of the present invention, thicknesses of the two third members in the joining part are equal to each other, and abutting faces of the two third members and a center of curvature of the spherical surface part are substantially coincided with each other in the thickness direction of the second member. According to this structure, the spherical surface part can be fixed to the joining part in the thickness direction of the second member in a well-balanced manner.

In at least an embodiment of the present invention, the second member is formed in a frame shape, the contact end face is formed at an inner peripheral end of the second member, and the joining part is formed in a range from the inner peripheral end of the second member to its outer peripheral end. According to this structure, even when a laser is irradiated from an outer peripheral side with respect to the second member formed in a frame shape toward the portion where the spherical surface part and the joining part are to be joined to each other, a portion of the second member except the joining part can be prevented from being irradiated by the laser. Therefore, a laser can be irradiated with a high degree of accuracy toward the portion where the spherical surface part and the joining part are to be joined to each other from an outer peripheral side with respect to the second member where a work space is easily secured.

Further, according to at least an embodiment of the present invention, there may be provided a manufacturing method of a welded structure which is formed such that a spherical surface part of a first member having the spherical surface part formed in a spherical surface shape and an end part of a second member formed in a plate shape are joined to each other by laser welding. The manufacturing method includes previously forming a contact part with which a part of the spherical surface part is contacted in a part of an end face of the second member before laser welding is performed as a contact end face, previously forming a joining part including the contact end face in the second member which is structured of two third members formed in a plate shape and laminated so as to abut with each other, at least before laser welding is performed, previously setting a plate thickness of the joining part to be thinner than a plate thickness of a portion of the second member except the joining part, and joining the spherical surface part to the joining part by laser welding and thereby the two third members and the spherical surface part are joined to each other and the two third members are joined to each other.

In the manufacturing method of a welded structure in at least an embodiment of the present invention, a part of an end face of the second member before laser welding is performed is formed to be a contact end face having a contact part with which a part of the spherical surface part is contacted. Further, a plate thickness of the joining part of the second member, which includes the contact end face and is joined to the spherical surface part by welding, is thinner than a plate thickness of a portion of the second member except the joining part at least before laser welding is performed. Therefore, the maximum gap space in a direction perpendicular to a thickness direction of the second member between the spherical surface part and the contact end face can be reduced before laser welding is performed and thus output of a laser when the spherical surface part is welded to the joining part can be reduced. Further, output of a laser when the spherical surface part is welded to the joining part can be reduced and, in addition, the maximum gap space in a direction perpendicular to the thickness direction of the second member between the spherical surface part and the contact end face can be reduced and thus generation of a spatter when the spherical surface part is welded to the joining part can be suppressed.

In at least an embodiment of the present invention, a laser is irradiated from both sides in the thickness direction of the second member in a state that abutting faces of the two third members and a center of curvature of the spherical surface part are substantially coincided with each other in the thickness direction of the second member and thereby the spherical surface part is joined to the joining part.

In at least an embodiment of the present invention, a cut-out part is previously formed in the joining part of one of the two third members so that the cut-out part penetrates in a thickness direction of the third member and opens on a contact end face side of the joining part, and a laser is irradiated to the cut-out part from a side of the one of the two third members formed with the cut-out part in the thickness direction of the second member and thereby the two third members and the spherical surface part are joined to each other and the two third members are joined to each other.

According to this method, when the spherical surface part is to be welded to the joining part, a laser is not required to irradiate from the other third member side and, as a result, when the spherical surface part is to be welded to the joining part, the number of irradiation times of the laser can be reduced. Therefore, a manufacturing process of the welded structure can be simplified.

In at least an embodiment of the present invention, the second member is a gimbal spring which is structured of two plate springs laminated on each other, the gimbal spring is formed in a substantially square frame shape having four sides each of which is provided with a spring part, the joining part is formed at a corner part of each of four corners of the gimbal spring, the first member is made of a spherical body, a plate thickness of the joining part is thinner than a plate thickness of the spring part of the gimbal spring and is smaller than a diameter of the spherical body, and four spherical bodies are respectively joined to the contact end faces which are provided on inner sides of the corner parts of the four corners of the gimbal spring by laser welding. In this case, the welded structure may be manufactured so that the gimbal spring is structured of two plate springs having the same width and the same thickness which are laminated so as to abut with each other, the joining part of one of the two plate springs is previously formed with a cut-out part for exposing the joining part of the other plate spring abutted with the spherical body, and a laser is irradiated to the cut-out part from a side of the one of the two plate springs formed with the cut-out part and thereby the spherical body and the joining part of the one of the two plate springs are welded to each other and the spherical body and the joining part of the other plate spring are welded to each other.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Embodiments of the present invention will be described below with reference to the accompanying drawings.

Entire Structure of Photographing Optical Device

Figure 1:
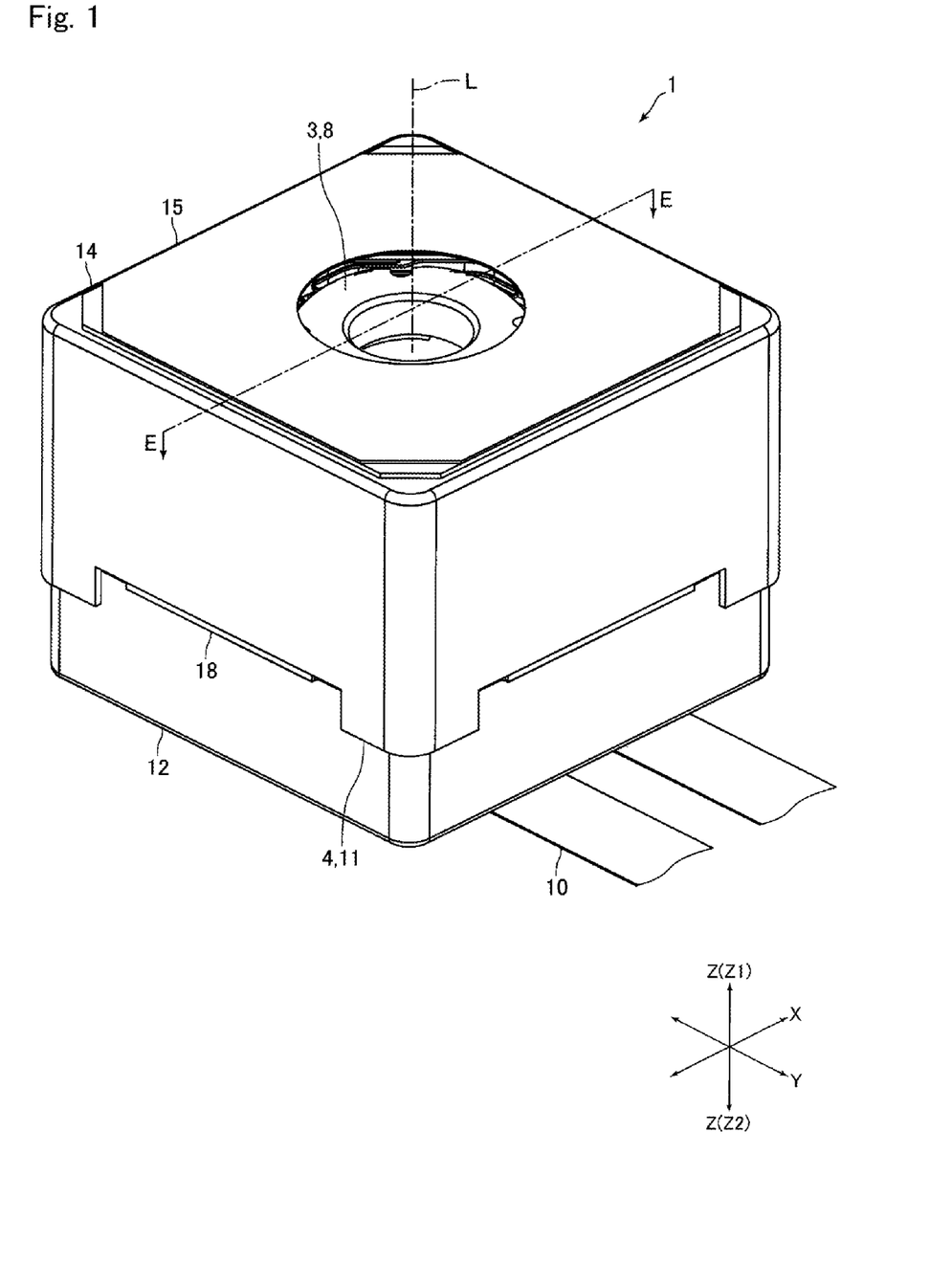
FIG. 1 is a perspective view showing a photographing optical device on which a welded structure in accordance with an embodiment of the present invention is mounted.
Figure 2:
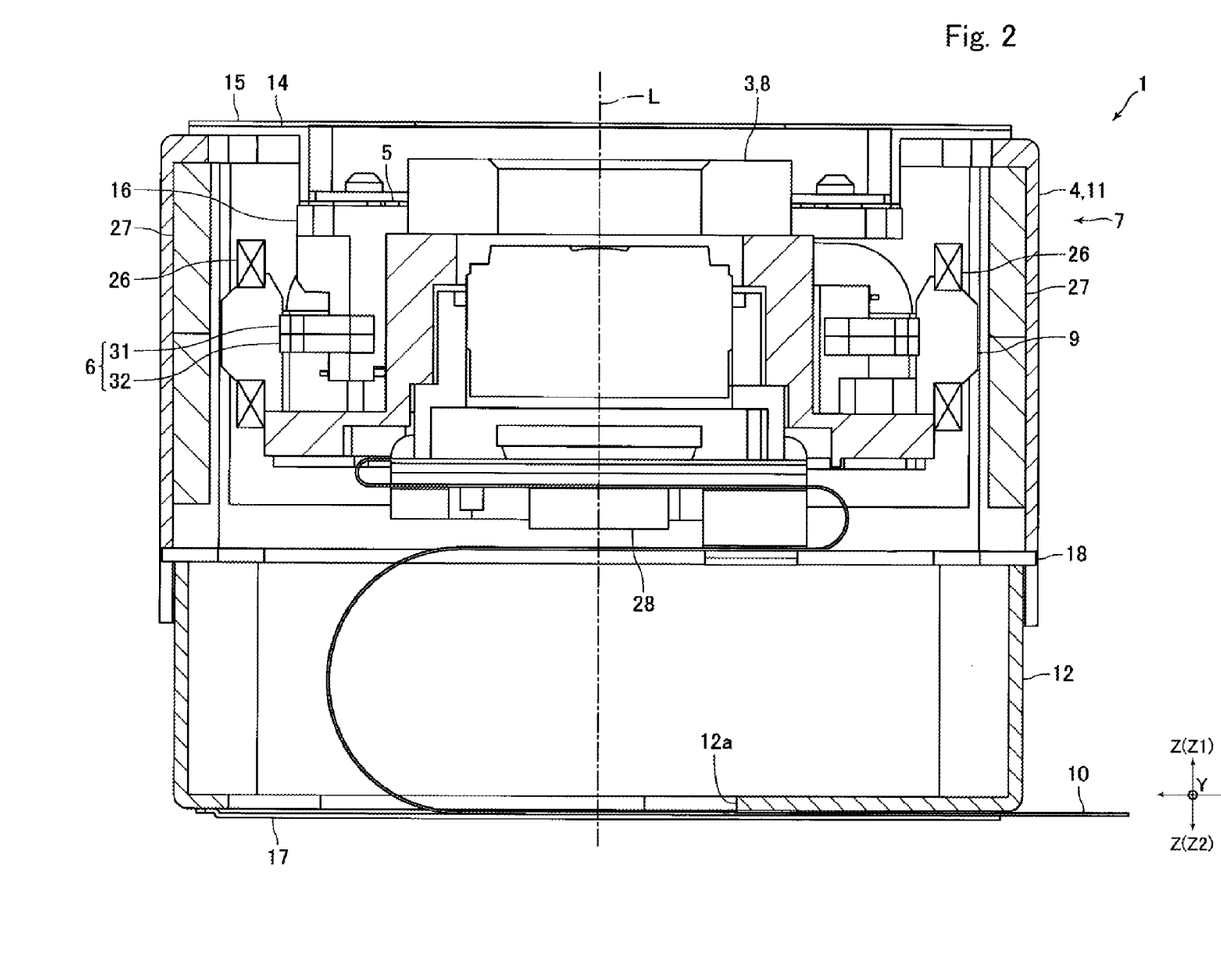
FIG. 2 is a cross-sectional view showing the "E-E" cross section in FIG. 1.
Figure 3:
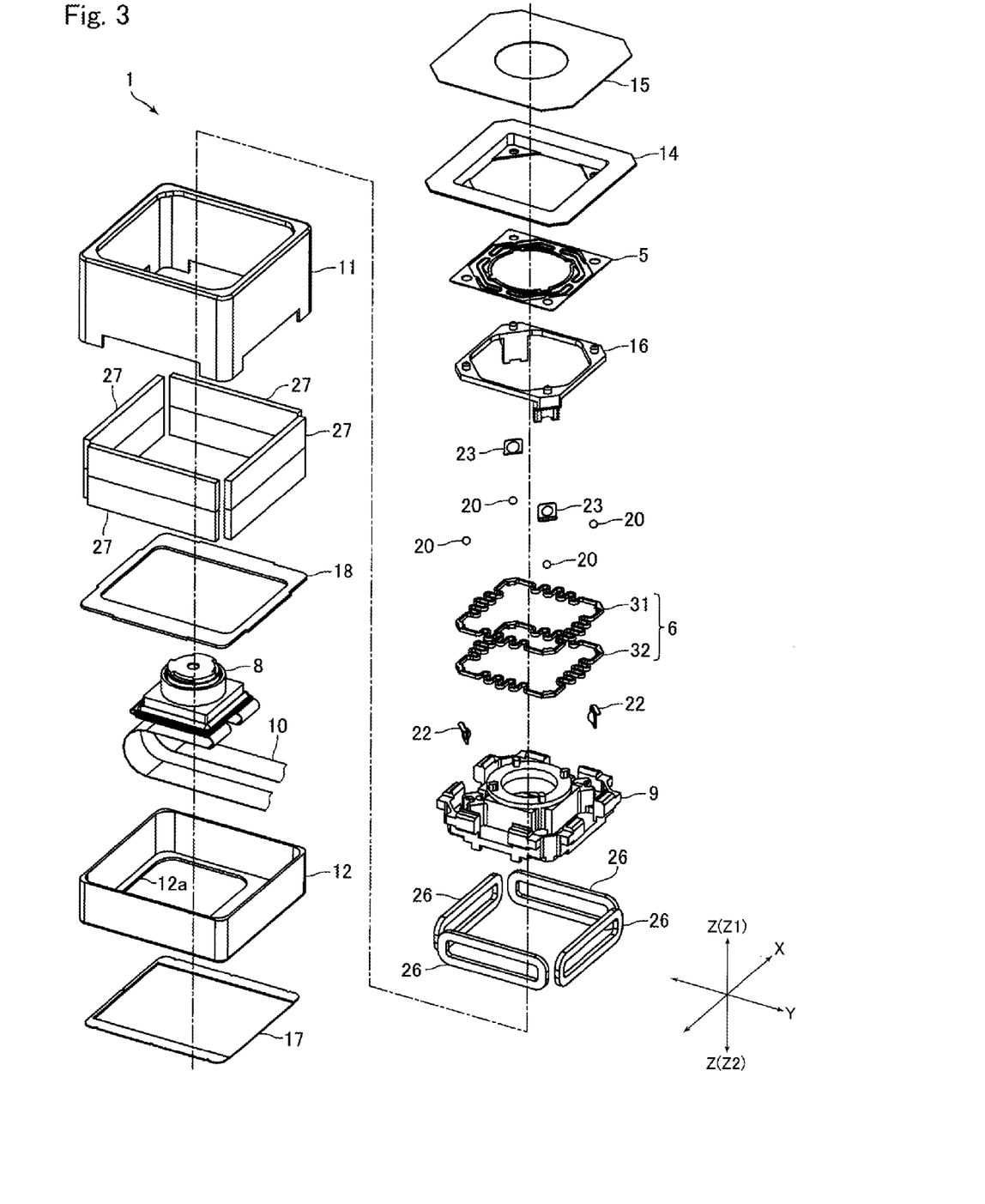
FIG. 3 is an exploded perspective view showing the photographing optical device in FIG. 1.

FIG. 1 is a perspective view showing a photographing optical device 1 on which a welded structure 21 in accordance with an embodiment of the present invention is mounted. FIG. 2 is a cross-sectional view showing the "E-E" cross section in FIG. 1. FIG. 3 is an exploded perspective view showing the photographing optical device 1 shown in FIG. 1. In the following descriptions, as shown in FIG. 1 and the like, three directions perpendicular to each other are respectively set in an "X" direction, a "Y" direction and a "Z" direction. The "X" direction is set in a right and left direction, the "Y" direction is set in a front and rear direction, and the "Z" direction is set in an upper and lower direction. Further, a "Z1" direction side in FIG. 1 and the like is referred to as an "upper" side and a "Z2" direction side is referred to as a "lower" side.

A photographing optical device 1 in this embodiment is a small and thin camera which is mounted on a portable apparatus such as a cell phone, a drive recorder, a monitor camera system or the like and is provided with a shake correction function for correcting shake such as hand shake. The photographing optical device 1 is formed in a substantially quadrangular prism shape as a whole. In this embodiment, the photographing optical device 1 is formed in a substantially square shape when viewed in a direction of an optical axis "L" (optical axis direction) of a lens for photographing and four side faces of the photographing optical device 1 are substantially parallel to planes configured of the right and left direction and the upper and lower direction, or planes configured of the front and rear direction and the upper and lower direction.

The photographing optical device 1 includes a movable module 3 on which a lens for photographing and an imaging element are mounted, and a support body 4 which swingably holds the movable module 3. The movable module 3 is connected with the support body 4 through spring members 5 and 6. Further, the photographing optical device 1 is provided with a shake correction mechanism 7 by which the movable module 3 is swung with respect to the support body 4 to correct a shake such as a hand shake. In this embodiment, the upper and lower direction is substantially coincided with an optical axis direction of the movable module 3 when the movable module 3 is not swung. Further, in this embodiment, an imaging element is mounted on a lower end of the movable module 3 and an object to be photographed which is disposed on an upper side is photographed.

The movable module 3 is formed in a substantially quadrangular prism shape whose shape when viewed in the optical axis direction is a substantially square shape as a whole. The movable module 3 includes a camera module 8 having a lens and an imaging element, and a holder 9 to which the camera module 8 is fixed. The camera module 8 includes, for example, a movable body which holds a lens and is movable in an optical axis direction, a holding body which movably holds the movable body in the optical axis direction, a plate spring which connects the movable body with the holding body, and a drive mechanism configured to drive the movable body in the optical axis direction. In other words, the camera module 8 is provided with an autofocus mechanism. A flexible printed circuit board 10 is extended from a lower end side of the camera module 8. The holder 9 is formed so that its outward shape when viewed in the optical axis direction is a substantially square shape. Further, a tube-shaped part is formed at a center of the holder 9. The camera module 8 is fixed to an inner peripheral side of the tube-shaped part of the holder 9 so that an outer peripheral side of the camera module 8 is covered by the holder 9. In accordance with an embodiment of the present invention, the camera module 8 may be provided with no autofocus mechanism.

The support body 4 includes a case body 11, which structures four side faces of the support body 4 in the front and rear direction and in the right and left direction and a lower case body 12 which structures a lower end side portion of the support body 4. In this embodiment, the case body 11 structures four side faces of the photographing optical device 1 in the front and rear direction and in the right and left direction, and the lower case body 12 structures a lower end side portion of the photographing optical device 1. The case body 11 is formed in a substantially rectangular tube shape. A cover 14 formed in a substantially quadrangular frame shape is fixed to an upper end of the case body 11. An upper face of the cover 14 is covered by a cover sheet 15. Further, a frame 16 formed in a substantially quadrangular frame shape is fixed to a lower end side of the cover 14. The case body 11 is disposed so as to cover the movable module 3 and the shake correction mechanism 7 from an outer peripheral side. The lower case body 12 is formed in a substantially rectangular tube shape with a bottom. A through-hole 12a is formed in a bottom part of the lower case body 12. The through-hole 12a is closed by a bottom plate 17 which is fixed to an under face of the lower case body 12. A stopper 18 for restricting a swing range of the movable module 3 is fixed between a lower end of the case body 11 and an upper end of the lower case body 12.

A spring member 5 is a plate spring which is formed in a flat plate shape. Further, the spring member 5 is, for example, formed of metal material. The spring member 5 is provided with a movable side fixed part which is fixed to an upper end side of the movable module 3, a support side fixed part which is fixed to an upper end side of the support body 4, and a plurality of arm parts which connect the movable side fixed part with the support side fixed part. The spring member 5 functions to maintain posture of the movable module 3 when an electric current is not supplied to coils 26 for shake correction described below structuring the shake correction mechanism 7.

The spring member 6 is a plate spring. Specifically, the spring member 6 is a gimbal spring which swingably holds the movable module 3. The spring member 6 is formed in a substantially square frame shape by using one plate spring having a substantially constant width and is disposed so that its four sides are substantially parallel to the front and rear direction and the right and left direction. A meandering part 6a which is formed so that a plate spring having a substantially constant width is meandered with respect to the front and rear direction or the right and left direction is formed at a center part of each of the sides of the spring member 6 formed in a substantially square frame shape. Four sides of the spring member 6 act as spring parts (see FIG. 4). A spherical body 20 formed in a ball shape is fixed to an inner side of each of four corner parts of the spring member 6 as connecting parts of the four sides. In other words, four spherical bodies 20 are fixed to inner peripheral sides of the spring member 6. The spherical body (ball) 20 is formed of metal material. For example, the spherical body 20 is formed of stainless steel. The spherical body 20 is joined to an inner peripheral portion at a corner part of the spring member 6 by laser welding. In this embodiment, the spring member 6 and four spherical bodies 20 are joined to each other by laser welding to form a welded structure 21 (see FIG. 4). A detailed structure of the welded structure 21 will be described below.

Among four spherical bodies 20, two spherical bodies 20 which are disposed on one diagonal line of the spring member 6 are supported by a support member 22 which turnably supports the spherical body 20, and two remaining spherical bodies 20 are supported by a support member 23 which turnably supports the spherical body 20. The support member 22 is fixed to an upper end side of the holder 9. The support member 23 is fixed to a lower end side of the frame 16. The support members 22 and 23 are formed with a recessed part in a hemispheric shape in which a part of the spherical body 20 is disposed. The support members 22 and 23 turnably hold the spherical bodies 20 from an inner peripheral side with respect to the spring member 6. Four spherical bodies 20 are fixed to respective four corner parts of the spring member 6 as a gimbal spring and thus the movable module 3 can be swingably held by the support body 4 through the spring member 6.

The shake correction mechanism 7 includes shake correction coils 26 which are respectively fixed to four side faces of the holder 9 and shake correction magnets 27 which are respectively fixed to four inner side faces of the case body 11. The shake correction coil 26 is formed by winding a conducting wire in a substantially rectangular frame shape. The shake correction magnet 27 is formed in a rectangular flat plate shape and is disposed so as to face the shake correction coil 26.

In the photographing optical device 1 structured as described above, when a variation of inclination of the movable module 3 is detected by a gyroscope 28 (see FIG. 2) which is attached to a lower end face of the movable module 3, an electric current is supplied to the shake correction coil 26 based on a detected result by the gyroscope 28. Further, when an electric current is supplied to the shake correction coil 26, the spherical body 20 is turned with the support member 23 as a center and the support member 22 is turned with the spherical body 20 as a center and the spring parts of the spring member 6 are resiliently bent. As a result, the movable module 3 is swung so as to incline the optical axis "L" and the shake is corrected.

Structure of Welded Structure

Figure 4:
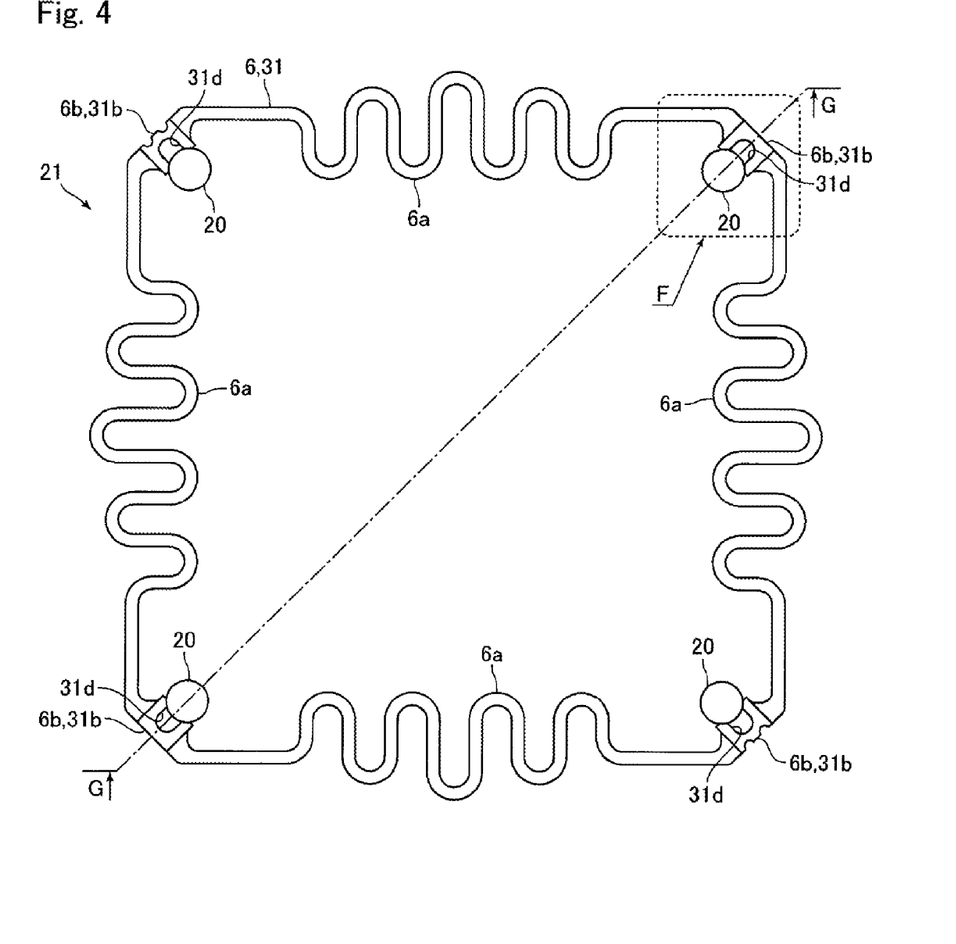
FIG. 4 is a plan view showing a welded structure in accordance with an embodiment of the present invention.
Figure 5:
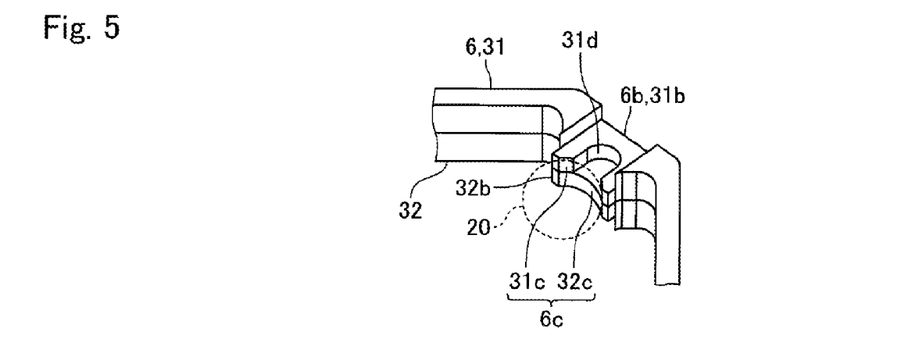
FIG. 5 is an enlarged perspective view showing the "F" part in FIG. 4.
Figure 6:
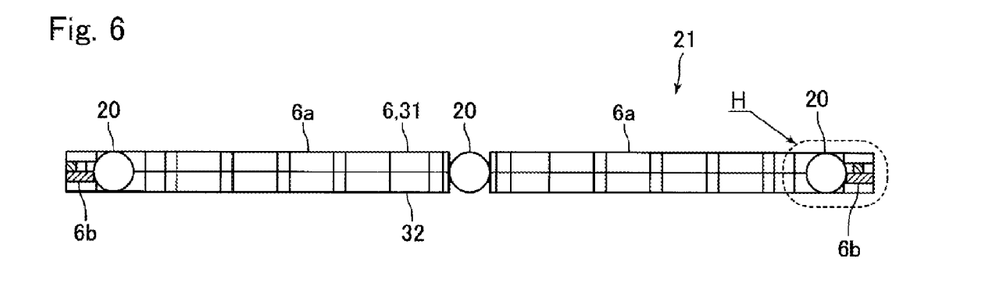
FIG. 6 is a cross-sectional view showing the "G-G" cross section in FIG. 4.
Figure 7:
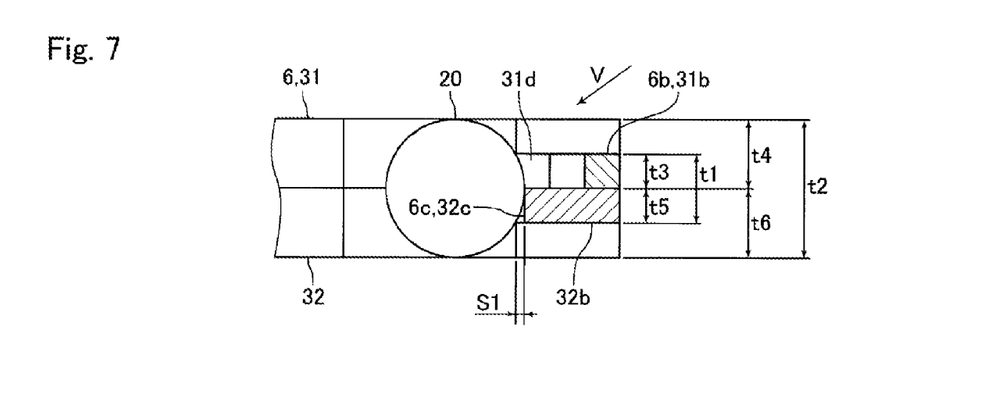
FIG. 7 is an enlarged view showing the "H" part in FIG. 6.

FIG. 4 is a plan view showing a welded structure 21 in accordance with an embodiment of the present invention. FIG. 5 is an enlarged perspective view showing the "F" part in FIG. 4. FIG. 6 is a cross-sectional view showing the "G-G" cross section in FIG. 4. FIG. 7 is an enlarged view showing the "H" part in FIG. 6.

The welded structure 21 is structured of the spring member 6 and four spherical bodies 20 which are joined to each other by laser welding. As described above, the spring member 6 is a plate spring and is formed in a plate shape as a whole and is formed in a substantially square frame shape. Further, the spring member 6 is structured of two spring members 31 and 32 having the same width and the same thickness which are laminated so as to abut with each other. The spring members 31 and 32 are formed of metal material. For example, the spring members 31 and 32 are formed of stainless steel. Further, the spring members 31 and 32 are formed in a plate shape as a whole and are formed in a substantially square frame shape.

Further, as described above, the spherical body 20 is joined to each of four corner parts of the spring member 6 by laser welding. In other words, each of four corner parts of the spring member 6 is formed with a joining part 6b to which the spherical body 20 is joined by laser welding. Before laser welding is performed, as shown in FIG. 7, a plate thickness "t1" of the joining part 6b is thinner than a plate thickness "t2" of other portions of the spring member 6. In other words, a portion except the joining part 6b, i.e., the portion of the spring part having the meandering part 6a is thicker than the joining part 6b. Specifically, the plate thickness "t1" is set to be about ½-¼ of the plate thickness "t2". Further, in this embodiment, an entire region from an inner peripheral end to an outer peripheral end of four corners of the spring member 6 is formed as the joining part 6b. In other words, the joining part 6b is formed as a recessed part which is recessed to an inner side in its thickness direction at four corner parts of the spring member 6. The recessed part is formed in a range from an inner peripheral end of the spring member 6 to its outer peripheral end and is used as the joining part 6b. In this embodiment, after laser welding is performed, the plate thickness "t1" of the joining part 6b is thinner than the plate thickness "t2" of other portions of the spring member 6. However, after laser welding is performed, a plate thickness of a part of the joining part 6b may be larger than the plate thickness "t2".

An inner side end of the joining part 6b in a radial direction of the spring member 6 is formed with a contact end face 6c which includes a contact part with which a part of the spherical body 20 is contacted on the same face before laser welding is performed. In other words, a part of an inner side end face of the joining part 6b of the spring member 6 before laser welding is performed is formed as a curved contact end face 6c. The contact end face 6c is formed at an inner peripheral end of the spring member 6 and the joining part 6b includes the contact end face 6c. In this embodiment, a part of the curved contact end face 6c is formed as a contact part but the entire contact end face 6c may be formed as a contact part.

The spring member 31 and the spring member 32 are formed in the same shape having the same width and the same thickness as each other except that a cut-out part 31d described below is formed in the spring member 31. The spring member 31 and the spring member 32 are structured like one spring member 6 when they are laminated on each other. In this embodiment, abutting faces of two spring members 31 and 32 and a center of curvature of the spherical body 20 (in other words, center of the spherical body 20) are substantially coincided with each other in a thickness direction of the spring member 6. Further, in this embodiment, the plate thickness "t2" of the spring member 6 and a diameter of the spherical body 20 are equal to each other. Therefore, when the spherical body 20 and the spring member 6 are set on a placing face at the time of welding, the abutting faces of two spring members 31 and 32 and the center of the spherical body 20 are substantially coincided with each other. In other words, the plate thickness "t1" of the joining part 6b is thinner than a diameter of the spherical body 20. Specifically, the plate thickness "t1" of the joining part 6b is set to be about a half thickness (about ½-¼) of the diameter of the spherical body 20 and thus the gap space "S1" between the spherical body 20 and the contact end face 6c in a direction perpendicular to the thickness direction of the spring member 6 is reduced. Therefore, when a laser is irradiated to the cut-out part 31d in the direction shown by the arrow "V" in FIG. 7, the spherical body 20 and the contact end face 6c are easily welded and joined to each other.

Before laser welding is performed, a plate thickness "t3" of the first joining part 31b which is a portion of the spring member 31 structuring the joining part 6b is thinner than a plate thickness "t4" of other portions of the spring member 31 (for example, a portion of the spring part having the meandering part 6a). Further, a plate thickness "t5" of the second joining part 32b which is a portion of the spring member 32 structuring the joining part 6b is thinner than a plate thickness "t6" of other portions of the spring member 32 (for example, a portion of the spring part having the meandering part 6a). In other words, in a state before laser welding is performed, at four corners of the spring member 6, a recessed part which is recessed from one face in the thickness direction of the spring member 6 is formed and a recessed part which is recessed from the other face in the thickness direction of the spring member 6 is formed. The joining part 6b is structured of the first joining part 31b and the second joining part 32b which are laminated so as to abut with each other.

As described above, the spring member 31 and the spring member 32 are formed in a substantially same shape as each other and the plate thickness "t3" and the plate thickness "t5" are set to be equal to each other. Further, the plate thickness "t4" and the plate thickness "t6" are equal to each other. Further, in this embodiment, the plate thickness "t3" is set to be thinner than the plate thickness "t4", and the plate thickness "t5" is set to be thinner than the plate thickness "t6" after laser welding is performed. However, a plate thickness of a part of the first joining part 31b may be larger than the plate thickness "t4" and a plate thickness of a part of the second joining part 32b may be larger than the plate thickness ""t6" after laser welding is performed.

The first joining part 31b before laser welding is performed is formed with the cut-out part 31d which is penetrated in the thickness direction of the spring member 31 and is opened on an inner peripheral end side of the spring member 31. The cut-out part 31d is formed in a substantially "U"-shape when viewed in the thickness direction of the spring member 31. Therefore, a first contact end face 31c structuring a part of the contact end face 6c is formed in a two divided faces at an inner side end of the first joining part 31b in a radial direction of the spring member 31 (in other words, a radial direction of the spring member 6) before laser welding is performed. Further, a second contact end face 32c structuring a part of the contact end face 6c is continuously formed in a circumferential direction at an inner side end of the second joining part 32b in a radial direction of the spring member 32 (in other words, a radial direction of the spring member 6) before laser welding is performed. The first joining part 31b is formed with the cut-out part 31d in a substantially "U"-shape and thus, when viewed in the direction shown by the arrow "V" in FIG. 7, an upper face of the inner side end of the second joining part 32b which is the abutting face with the first joining part 31b of the second joining part 32b is exposed through the cut-out part 31d.

When the spherical body 20 is to be joined to the spring member 6 by laser welding, a laser is irradiated to the cut-out part 31d from an outer peripheral side of the spring member 6 and from the spring member 31 side in a state that the spherical body 20 is abutted with the curved contact end face 6c so that the abutting faces of two spring members 31 and 32 and the center of the spherical body 20 are substantially coincided with each other in the thickness direction of the spring member 6. In other words, a laser is irradiated to the cut-out part 31*d* in a direction shown by the arrow "V" in FIG. 7. Specifically, a laser is irradiated to two positions on the abutting faces of the spring members 31 and 32, the two positions being an inner side end of an edge of the cut-out part 31*d* in a radial direction of the spring member 6. In other words, a laser is irradiated to a first portion on an inner side end of the first joining part 31*b*, which is a portion from one of the two divided first contact end faces 31*c* to the abutting face with the first joining part 31*b* of the second joining part 32*b* that is exposed through the cut-out part 31*d,* and a second portion on the inner side end of the first joining part 31*b,* which is a portion from the other of the two divided first contact end faces 31*c* to the abutting face with the first joining part 31*b* of the second joining part 32*b* that is exposed through the cut-out part 31*d.* In this case, a laser is irradiated to the cut-out part 31*d* from the spring member 31 side and thus, in the welded structure 21 after the laser welding is performed, a laser welded mark is formed on the spring member 31 side in the thickness direction of the spring member 6.

In this embodiment, when a laser is irradiated and the spherical body 20 is joined to the joining part 6*b* by laser welding, the spring member 6 and the spherical body 20 are joined to each other (in other words, the spring members 31 and 32 and the spherical body 20 is joined to each other) and two spring members 31 and 32 are also joined to each other. In this embodiment, the spring member 31 and the spring member 32 are joined to each other at only a portion where the spring members 31 and 32 and the spherical body 20 are joined to each other. The spring member 31 and the spring member 32 are not joined to each other at other portions. Further, in a case that a width of the cut-out part 31*d* is narrow, a laser may be irradiated to one position on the abutting faces of the spring members 31 and 32, the one position being an inner peripheral end of the cut-out part 31*d* in a radial direction of the spring member 6.

The spherical body 20 in this embodiment is a first member having a spherical surface part which is formed in a spherical surface shape. In other words, the first member in this embodiment is a spherical body 20 whose entire face is a spherical surface part. Further, the spring member 6 in this embodiment is a second member formed in a plate shape and the spring members 31 and 32 are third members which are formed in a plate shape.

Principal Effects in this Embodiment

Figure 8:
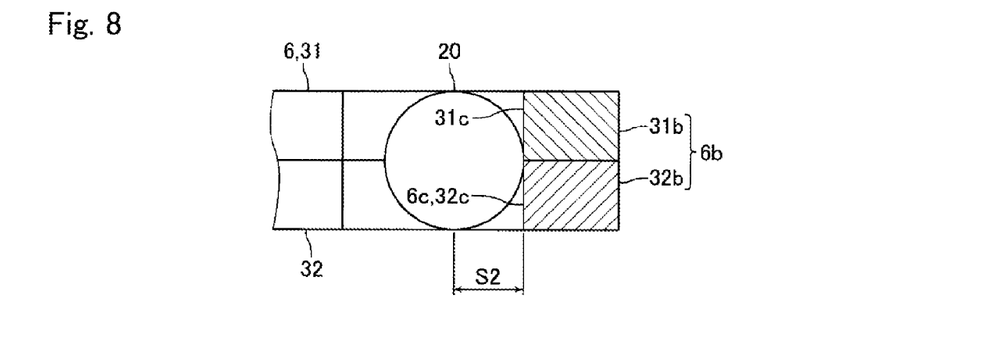
FIG. 8 is a cross-sectional view for explaining an effect of a welded structure shown in FIG. 4.

As described above, in this embodiment, the contact end face 6*c* including a contact part with which a part of the spherical body 20 is contacted on the same face is formed at an inner side end of the joining part 6*b* in the radial direction of the spring member 6 before laser welding is performed. Further, in this embodiment, the plate thickness "t1" of the joining part 6*b* including the contact end face 6*c* is thinner than the plate thickness "t2" of a portion of the spring member 6 except the joining part 6*b*. Further, the plate thickness "t1" of the joining part 6*b* is smaller than the diameter of the spherical body 20. Therefore, in this embodiment, the maximum gap space "S1" between the spherical body 20 and the contact end face 6*c* in a direction perpendicular to the thickness direction of the spring member 6 can be made small before laser welding is performed. In other words, as shown in FIG. 8, for example, when the plate thickness of the joining part 6*b* is equal to the plate thickness of a portion of the spring member 6 except the joining part 6*b* before laser welding is performed, the maximum gap space "S2" between the spherical body 20 and the contact end face 6*c* in the direction perpendicular to the thickness direction of the spring member 6 becomes large before laser welding is performed. However, in this embodiment, as shown in FIG. 7, the plate thickness "t1" is thinner than the plate thickness "t2", for example, the plate thickness "t1" is set to be about half of the plate thickness "t2" and thus the maximum gap space "S1" is small. Therefore, according to this embodiment, output of a laser when the spherical body 20 is welded to the joining part 6*b* can be reduced. Further, in this embodiment, output of a laser can be reduced when the spherical body 20 is welded to the joining part 6*b* and, since the maximum gap space "S1" can be made small, generation of a spatter is suppressed when the spherical body 20 is welded to the joining part 6*b*.

In this embodiment, when a laser is irradiated and the spherical body 20 is joined to the joining part 6*b* by laser welding, the spring members 31 and 32 and the spherical body 20 are joined to each other and the spring member 31 and the spring member 32 are also joined to each other. Therefore, in this embodiment, another process is not required to provide separately for joining the spring member 31 to the spring member 32. Accordingly, in this embodiment, a manufacturing process of the welded structure 21 can be simplified.

Further, in this embodiment, the cut-out part 31*d* is formed in the first joining part 31*b* before laser welding is performed and, when a laser is irradiated to the cut-out part 31*d* from the spring member 31 side, the spring members 31 and 32 and the spherical body 20 are joined to each other and the spring member 31 and the spring member 32 are also joined to each other. Therefore, in this embodiment, when the spherical body 20 is to be welded to the joining part 6*b,* a laser is not required to irradiate from the spring member 32 side and, as a result, when the spherical body 20 is to be welded to the joining part 6*b,* the number of irradiation times of a laser can be reduced. Accordingly, in this embodiment, a manufacturing process of the welded structure 21 can be simplified.

In this embodiment, the plate thickness "t3" of the first joining part 31*b* and the plate thickness "t5" of the second joining part 32*b* are set to be equal to each other. Further, in the thickness direction of the spring member 6, the abutting face of two spring members 31 and 32 and the center of the spherical body 20 are substantially coincided with each other. Therefore, in this embodiment, in the thickness direction of the spring member 6, the spherical body 20 is fixed to the joining part 6*b* in a well-balanced manner.

In this embodiment, the joining part 6*b* is formed in a range from an inner peripheral end of the spring member 6 to its outer peripheral end. Therefore, in this embodiment, even when a laser is irradiated toward the portion where the joining part 6*b* and the spherical body 20 are joined to each other from an outer peripheral side with respect to the spring member 6, a portion of the spring member 6 except the joining part 6*b* can be prevent from being irradiated by the laser. Accordingly, in this embodiment, a laser can be irradiated toward the portion where the joining part 6*b* and the spherical body 20 are joined to each other from an outer peripheral side with respect to the spring member 6 where a work space is easily secured with a high degree of accuracy.

In this embodiment, the spring member 6 is structured of two spring members 31 and 32 which are laminated so as to abut with each other. In a case that the spring member 6 formed in a plate shape is produced by etching or press working, a certain limitation is found in an aspect ratio which is a ratio between a width and a thickness of the spring member 6 and, when the width of the spring member 6 is narrowed, the spring member 6 is unable to be made thick. However, in this embodiment, the spring members 31 and 32 whose width is narrow are produced by etching or press working and thus, even when the thicknesses of the spring members 31 and 32 are thin, the thickness of the spring member 6 can be made thick. Therefore, according to this embodiment, the thickness of the spring member 6 can be set in a desired thickness and, as a result, the spring characteristics of the spring member 6 which is a gimbal spring can be set in desired spring characteristics.

Other Embodiments

Although the present invention has been shown and described with reference to a specific embodiment, various changes and modifications will be apparent to those skilled in the art from the teachings herein.

Figure 9:
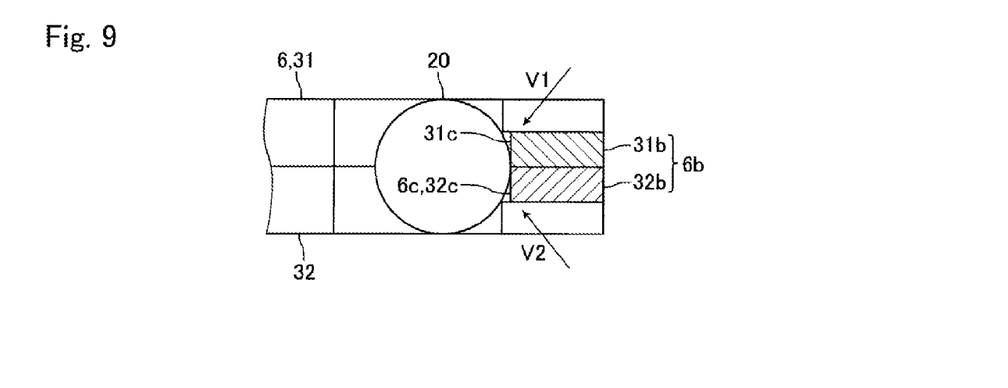
FIG. 9 is an expanded sectional view showing a structure of a joining part in accordance with another embodiment of the present invention.

In the embodiment described above, the cut-out part 31d is formed in the first joining part 31b before laser welding is performed. However, as shown in FIG. 9, it may be structured that no cut-out part 31d is formed in the first joining part 31b before laser welding is performed. In this case, a laser is irradiated from an outer peripheral side with respect to the spring member 6 and from the spring member 31 side, and the laser is irradiated from an outer peripheral side with respect to the spring member 32 and from the spring member 6 side and thereby the spherical body 20 is joined to the joining part 6b by laser welding. In other words, a laser is irradiated in a direction shown by the arrow "V1" and a direction shown by the arrow "V2" in FIG. 9 and thereby a spherical body 20 is joined to the joining part 6b by laser welding. In this case, in the welded structure 21 after laser welding is performed, a laser welding mark is formed on both sides of the spring member 31 side and the spring member 32 side in the thickness direction of the spring member 6.

In the embodiment described above, the plate thickness "t3" of the first joining part 31b is set to be thinner than the plate thickness "t4" of other portions of the spring member 31, and the plate thickness "t5" of the second joining part 32b is set to be thinner than the plate thickness "t6" of other portions of the spring member 32. However, the present invention is not limited to this embodiment. For example, when the plate thickness "t1" of the joining part 6b is set to be thinner than the plate thickness "t2" of other portions of the spring member 6, the plate thickness "t3" may be set in a thickness not less than the plate thickness "t4". In this case, the plate thickness "t5" is set to be further thinner than the dimension in the embodiment described above. Further, when the plate thickness "t1" is set to be thinner than the plate thickness "t2", the plate thickness "t5" may be set in a thickness not less than the plate thickness "t6". In this case, the plate thickness "t3" is set to be further thinner than the dimension in the embodiment described above.

In the embodiment described above, the abutting faces of two spring members 31 and 32 and the center of the spherical body 20 are substantially coincided with each other in a thickness direction of the spring member 6. However, the abutting faces of two spring members 31 and 32 and the center of the spherical body 20 may be displaced from each other in a thickness direction of the spring member 6. Further, in the embodiment described above, the joining part 6b is formed in a range from an inner peripheral end of the spring member 6 to its outer peripheral end. However, the joining part 6b may be formed in a range from an inner peripheral end of the spring member 6 to its predetermined midway position in a radial direction of the spring member 6 without being formed in a range from an inner peripheral end of the spring member 6 to its outer peripheral end.

In the embodiment described above, the spring member 6 is structured of two spring members 31 and 32 which are laminated so as to abut with each other. However, the present invention is not limited to this embodiment. For example, the spring member 6 may be structured of one spring member and, alternatively, the spring member 6 may be structured of three or more spring members laminated so as to abut with each other. In both cases that the spring member 6 is structured of one spring member and of three or more spring members, it is preferable that the center in a thickness direction of the spring member 6 and the center of the spherical body 20 are substantially coincided with each other in the thickness direction of the spring member 6.

In the embodiment described above, when the spherical body 20 is joined to the joining part 6b by laser welding, the spring members 31 and 32 are joined to the spherical body 20 and, in addition, the spring member 31 and the spring member 32 are also joined to each other. However, the present invention is not limited to this embodiment. For example, it may be structured that the spring member 31 and the spring member 32 are not joined to each other when the spherical body 20 is joined to the joining part 6b by laser welding. In this case, the spring member 31 and the spring member 32 are joined to each other by laser welding in a separate process.

In the embodiment described above, the welded structure 21 is mounted on the photographing optical device 1. However, the welded structure 21 may be mounted on a device other than the photographing optical device 1. Further, in the embodiment described above, the spring member 6 and four spherical bodies 20 are joined to each other by laser welding and thereby the welded structure 21 is structured. However, a welded structure to which at least an embodiment of the present invention is applied may be a welded structure formed of a plate-shaped member other than the spring member 6 and the spherical body 20 which are joined to each other by laser welding. Further, a welded structure to which at least an embodiment of the present invention is applied may be a welded structure formed of a member a part of which is a spherical surface part formed in a spherical surface shape and the spring member 6 which are joined to each other by laser welding. In this case, the spherical surface part is joined to the joining part 6b of the spring member 6 by laser welding. Further, in this case, it is preferable that the center in a thickness direction of the spring member 6 and the center of curvature of the spherical surface part are substantially coincided with each other in a thickness direction of the spring member 6. Further, a welded structure to which at least an embodiment of the present invention is applied may be a welded structure formed of a member a part of which is a spherical surface part formed in a spherical surface shape and a plate-shaped member other than the spring member 6 which are joined to each other by laser welding.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A welded structure comprising:
a first member having a spherical surface part which is formed in a spherical surface shape; and
a second member which is formed in a plate shape;
wherein a part of an end face of the second member before laser welding is performed is formed to be a contact end face having a contact part with which a part of the spherical surface part is contacted;
wherein the second member is formed with a joining part including the contact end face, the joining part being joined to the spherical surface part by laser welding;
wherein at least before laser welding is performed, a plate thickness of the joining part is thinner than a plate thickness of a portion of the second member except the joining part; and
wherein the spherical surface part of the first member and the end part of the second member are joined to each other by laser welding.

2. The welded structure according to claim 1, wherein the second member comprises two third members which are formed in a plate shape and are laminated so as to abut with each other.

3. The welded structure according to claim 2, wherein
the first member is a spherical body, an entirety of which is the spherical surface part, and
the second member is a gimbal spring.

4. The welded structure according to claim 2, wherein the spherical surface part is joined to the joining part by laser welding and thereby the two third members and the spherical surface part are joined to each other and the two third members are joined to each other.

5. The welded structure according to claim 4, wherein
thicknesses of the two third members in the joining part are equal to each other,
abutting faces of the two third members and a center of curvature of the spherical surface part are substantially coincided with each other in a thickness direction of the second member, and
the spherical surface part is joined to the joining part.

6. The welded structure according to claim 4, further comprising a cut-out part which is formed in the joining part of one of the two third members, the cut-out part being penetrated in a thickness direction of the third member and being opened on a side of the contact end face,
wherein the two third members and the spherical surface part are joined to each other and the two third members are also joined to each other.

7. The welded structure according to claim 6, wherein
thicknesses of the two third members in the joining part are equal to each other, and
abutting faces of the two third members and a center of curvature of the spherical surface part are substantially coincided with each other in the thickness direction of the second member.

8. The welded structure according to claim 1, wherein
the second member is formed in a frame shape,
the contact end face is formed at an inner peripheral end of the second member, and
the joining part is formed in a range from the inner peripheral end of the second member to its outer peripheral end.

9. The welded structure according to claim 1, wherein
the second member is a gimbal spring which is structured of two plate springs laminated on each other,
the gimbal spring is formed in a substantially square frame shape having four sides each of which is provided with a spring part,
the joining part is formed at a corner part of each of four corners of the gimbal spring,
the first member is made of a spherical body,
a plate thickness of the joining part is thinner than a plate thickness of the spring part of the gimbal spring and is smaller than a diameter of the spherical body, and
four spherical bodies are respectively joined to the contact end faces which are provided on inner sides of the corner parts of the four corners of the gimbal spring by laser welding.

10. The welded structure according to claim 9, wherein
the gimbal spring is structured of two plate springs having the same width and the same thickness which are laminated so as to abut with each other,
the joining part of one of the two plate springs is formed with a cut-out part for exposing the joining part of the other plate spring abutted with the spherical body, and
the spherical body and the joining part of the other plate spring are welded to each other.

11. The welded structure according to claim 9, wherein the gimbal spring is a gimbal spring for swingably holding a movable module on which a lens for photographing and an imaging element are mounted through the four spherical bodies.

12. A manufacturing method of a welded structure which is formed such that a spherical surface part of a first member having the spherical surface part formed in a spherical surface shape and an end part of a second member formed in a plate shape are joined to each other by laser welding, the manufacturing method comprising:
previously forming a contact part with which a part of the spherical surface part is contacted in a part of an end face of the second member as a contact end face before laser welding is performed;
previously forming a joining part including the contact end face in the second member which is structured of two third members formed in a plate shape and laminated so as to abut with each other;
at least before laser welding is performed, setting a plate thickness of the joining part to be thinner than a plate thickness of a portion of the second member except the joining part; and
joining the spherical surface part to the joining part by laser welding and thereby the two third members and the spherical surface part are joined to each other and the two third members are joined to each other.

13. The manufacturing method of a welded structure according to claim 12, wherein a laser is irradiated from both sides in a thickness direction of the second member in a state that abutting faces of the two third members and a center of curvature of the spherical surface part are substantially coincided with each other in the thickness direction of the second member and thereby the spherical surface part is joined to the joining part.

14. The manufacturing method of a welded structure according to claim 12, wherein
previously forming a cut-out part in the joining part of one of the two third members, the cut-out part penetrating in a thickness direction of the third member and opening a contact end face side of the joining part, and a laser is irradiated to the cut-out part from a side of the one of the two third members formed with the cut-out part in the thickness direction of the second member and thereby the two third members and the spherical surface part are joined to each other and the two third members are also joined to each other.

15. The manufacturing method of a welded structure according to claim 12, wherein
the second member is a gimbal spring which is structured of two plate springs laminated on each other,
the gimbal spring is formed in a substantially square frame shape having four sides each of which is provided with a spring part,
the joining part is formed at a corner part of each of four corners of the gimbal spring,
the first member is made of a spherical body,
a plate thickness of the joining part is thinner than a plate thickness of the spring part of the gimbal spring and is smaller than a diameter of the spherical body, and
four spherical bodies are respectively joined to the contact end faces which are provided on inner sides of the corner parts of the four corners of the gimbal spring by laser welding.

16. The manufacturing method of a welded structure according to claim 15, wherein
the gimbal spring is structured of two plate springs having the same width and the same thickness which are laminated so as to abut with each other,
the joining part of one of the two plate springs is previously formed with a cut-out part for exposing the joining part of the other plate spring abutted with the spherical body, and
a laser is irradiated to the cut-out part from a side of the one of the two plate springs formed with the cut-out part and thereby the spherical body and the joining part of the one of the two plate springs are welded to each other and the spherical body and the joining part of the other plate spring are welded to each other.

* * * * *